United States Patent [19]

Santhanam et al.

[11] Patent Number: 5,250,367
[45] Date of Patent: Oct. 5, 1993

[54] BINDER ENRICHED CVD AND PVD COATED CUTTING TOOL

[75] Inventors: Anakkavur T. Santhanam, Monroeville; Rajendra V. Godse, Greensburg; George P. Grab, Greensburg; Dennis T. Quinto, Greensburg; Kenneth E. Undercoffer, Greensburg; Prem C. Jindal, Greensburg, all of Pa.

[73] Assignee: Kennametal Inc., Latrobe, Pa.

[21] Appl. No.: 583,544

[22] Filed: Sep. 17, 1990

[51] Int. Cl.⁵ .............................. B24B 1/00
[52] U.S. Cl. .................... 428/698; 428/457; 428/469; 428/472; 428/697; 428/699; 428/701; 428/702; 51/295; 51/307; 51/309; 407/119
[58] Field of Search ............ 428/457, 469, 698, 697, 428/699, 217, 701, 702, 472; 51/295, 307, 309; 407/119

[56] References Cited

U.S. PATENT DOCUMENTS

| | | | |
|---|---|---|---|
| 3,755,866 | 9/1973 | Ohlsson | 29/95 C |
| 3,882,579 | 5/1975 | Peacock | 29/95 R |
| 3,955,038 | 5/1976 | Lindstrom et al. | 428/457 |
| 4,035,541 | 7/1977 | Smith et al. | 428/217 |
| 4,101,703 | 7/1978 | Schintlmeister | 428/216 |
| 4,268,569 | 5/1981 | Hale | 428/215 |
| 4,402,994 | 9/1983 | Kobayashi et al. | 427/38 |
| 4,426,267 | 1/1984 | Munz et al. | 204/192 |
| 4,448,802 | 5/1984 | Buhl et al. | 427/42 |
| 4,497,874 | 2/1985 | Hale | 428/551 |
| 4,610,931 | 9/1986 | Nemeth et al. | 428/547 |
| 4,640,869 | 2/1987 | Loth | 428/469 |
| 4,642,003 | 2/1987 | Yoshimura | 408/144 |
| 4,686,156 | 8/1987 | Baldoni, II et al. | 428/698 |
| 4,705,124 | 11/1987 | Abrahamson et al. | 175/410 |
| 4,708,037 | 11/1987 | Buljan et al. | 82/1 C |
| 4,720,437 | 1/1988 | Chudo et al. | 428/698 |
| 4,743,515 | 5/1988 | Fischer et al. | 428/698 |
| 4,770,946 | 9/1988 | Yamauchi et al. | 428/626 |
| 4,776,863 | 10/1988 | van den Berg et al. | 51/295 |
| 4,828,612 | 5/1989 | Yohe | 75/238 |
| 4,902,395 | 2/1990 | Yoshimura | 204/192.3 |
| 4,966,501 | 10/1990 | Nomura et al. | 407/119 |
| 4,984,940 | 1/1991 | Bryant et al. | 407/119 |
| 5,075,181 | 12/1991 | Quinto et al. | 428/698 |

FOREIGN PATENT DOCUMENTS

| | | |
|---|---|---|
| 0166708 | 6/1985 | European Pat. Off. |
| 0191554 | 8/1986 | European Pat. Off. |
| 0149024 | 2/1987 | European Pat. Off. |
| 0385283 | 2/1990 | European Pat. Off. |
| 133688 | 1/1979 | German Democratic Rep. |
| 148349 | 5/1981 | German Democratic Rep. |
| 53-025282 | 3/1978 | Japan |
| 54-010491 | 1/1979 | Japan |
| 0073392 | 6/1979 | Japan |
| 54-73392 | 6/1979 | Japan |
| 54-38755 | 11/1979 | Japan |
| 55-83517 | 6/1980 | Japan |
| 0083517 | 6/1980 | Japan |
| 56-152541 | 11/1981 | Japan |
| 6152541 | 11/1981 | Japan |
| 57-98670 | 6/1982 | Japan |

(List continued on next page.)

OTHER PUBLICATIONS

Japanese Industrial Standard JIS B4053 (1987) "Application of Carbides for Machining by Chip Removal Designation".

Japanese Industrial Standard JIS B4104 (1978) "Cemented Carbide Tips".

Bonetti et al., "CVD of Titanium Carbonitride at Moderate Temperatures," Surface Modification Technologies III (1990) proceedings held in Switzerland Aug. 28-Sep. 1, 1989 pp. 291-308.

Ken Gettelman, Editor, Modern Machine Shop, inter- (List continued on next page.)

Primary Examiner—A. A. Turner
Attorney, Agent, or Firm—John J. Prizzi

[57] ABSTRACT

Provided is a coated cutting tool having a binder enriched substrate. The coating includes at least one chemical vapor deposited (CVD) layer and at least one physical vapor deposited (PVD) layer. The PVD layer contains residual compressive stresses.

23 Claims, 1 Drawing Sheet

FOREIGN PATENT DOCUMENTS

| | | |
|---|---|---|
| 57-158372 | 9/1982 | Japan . |
| 57-192259 | 11/1982 | Japan . |
| 57-192260 | 11/1982 | Japan . |
| 67-196259 | 11/1982 | Japan . |
| 59-18474 | 4/1984 | Japan . |
| 60-25605 | 2/1985 | Japan . |
| 62-9808 | 1/1987 | Japan . |
| 62-56564 | 3/1987 | Japan . |
| 62-192576 | 8/1987 | Japan . |
| 62-214166 | 9/1987 | Japan . |
| 62-270764 | 11/1987 | Japan . |
| 1-104773 | 4/1989 | Japan . |
| 1-183310 | 7/1989 | Japan . |
| 2-30406 | 1/1990 | Japan . |
| 2-109619 | 4/1990 | Japan . |
| 1601224 | 4/1984 | United Kingdom . |

OTHER PUBLICATIONS view of James L. Hunt, "Mill with Coated Inserts? Sure!," Oct. 1987, pp. 52–59.

A. T. Santhanam et al., "Innovation in Coated Carbide Cutting Tools," Metal Powder Report, vol. 42, No. 12, Dec. 1987, pp. 840–845.

B. J. Nemeth et al., Proc. 10th Plansee Seminar, (1981) "The Microstructual Features and Cutting Performance of the High Edge Strength Kennametal Grade KC850*," pp. 613–627.

V. K. Sarin, "Cemented Carbide Cutting Tools," Advances in Powder Technology, Material Science Seminar, Louisville, Ky. ed. by G. Y. Chin (1981) pp. 253–288.

Buhl et al., "TiN Coatings on Steel," Thin Solid Films, vol. 80 (1981) pp. 265–270.

Munz et al., "A High Rate Sputtering Process for the Formation of Hard Function-Reducing TiN Coatings on Tools," Thin Solid Films, vol. 96 (1982), pp. 79–86.

Komachi et al., "A Comparison of Residual Stresses in Cemented Carbide Cutting Tips Coated with TiN by the CVD & PVD Processes & Their Effect on Failure Resistance," Surfacing Journal Int., vol. 1, No. 3 (1986) pp. 82–86.

Dearnley et al., "Evaluation of Failure Mechanisms of Ceramics & Coated Carbides Used for Machining Stainless Steels," Surface Engineering, vol. 2, No. 3 (1986) pp. 191–202.

Wolfe et al., "The Role of Hard Coatings in Carbide Milling Tools," J. Vac. Sci. Technol., A3 (1986) pp. 2747–2754.

Quinto et al., "High Temperature Microhardness of Hard Coatings Produced by Physical & Chemical Vapor Deposition," Thin Solid Films, vol. 153 (1987) pp. 19–36.

Jindal et al., "Load Dependence of Microhardness of Hard Coatings," Surface & Coatings Technology, vol. 36 (1988), pp. 683–694.

Jindal et al., "Adhesion Measurements of Chemically Vapor Deposited Hard Coatings on WC–Co Substrates," Thin Solid Films, vol. 54 (1987) pp. 361–375.

Rickerby et al., "Correlation of Process System Parameters with Structure & Properties of Physically Vapour-Deposited Hard Coatings," Thin Solid Films, vol. 157 (Feb. 1988) pp. 195–222.

Quinto et al., "Mechanical Properties, Structure & Performance of Chemically Vapour-Deposited & Physically Vapor Deposited Coating Carbide Tools," Materials Sci. & Eng. A106/A106 (1988) pp. 443–452.

Quinto, "Mechanical Property & Structure Relationships in Hard Coatings for Cutting Tools," J. Vac. Sci. Technol. A6(3), May/Jun. 1988, pp. 2149–2157.

Torok et al., "Young's Modulus of TiN, TiC, ZrN, and HfN," Thin Solid Films, 153 (1987) pp. 37–43.

American National Standard for Cuttings Tools—Indexable Inserts—Identification (ANSI) B2'2.4–1986.

"Kennametal/81 Millins Cutters for Greater Productivity," Catalogue No. A80-105(75) HO (1980) pp. 1–92.

Sarin "Cemented Carbide Cutting Tools" Advances in Powder Technology, Material Science Seminar, Louisville, KY (1981).

BINDER ENRICHED CVD AND PVD COATED CUTTING TOOL

BACKGROUND OF THE INVENTION

The present invention pertains to the field of coated cutting tools. It is especially concerned with those coated cutting inserts which may be subjected to repeated impacts during use, such as would be encountered during milling or other interrupted cutting operations.

Among the various metalcutting, processes, milling is the most demanding operation as far as cutting inserts are concerned. Milling involves interrupted chip removal at constant speed. The tool tip repeatedly enters, cuts and leaves the workpiece, sustaining both mechanical and thermal shocks. The magnitude of these shocks depends on the length of the cut and the interval between cuts. The entry and exit parameters may also determine the extent of the mechanical shock produced in the tool material These conditions are aggravated when cutting speeds are increased.

Cemented carbide cutting inserts employed in the milling operation often exhibit a number of parallel thermal cracks oriented normal to the cutting edge. These thermal cracks, by themselves, do not limit tool life. However, the inserts may also exhibit cracks parallel to the cutting edge. These cracks are believed to originate from the imposed mechanical shocks. The intersection of the thermal and mechanical cracks can cause edge chipping and premature tool failure.

The prevailing practice to combat the edge chipping problem with a given cutting edge geometry is to design the cemented carbide substrate with higher levels of the cobalt binder. This solution reduces the chipping problem, but introduces another problem, namely, deformation and/or flank wear of the cutting edge.

In the past, cemented carbide grades, both with and without a coating, have been utilized in milling applications. Examples of uncoated milling inserts include K2885 inserts and K2884 inserts, which are tungsten carbide based cemented carbide tools having about 10.5 and 8.5 weight percent cobalt, respectively, and both containing various levels of the solid solution carbide forming elements, tantalum, niobium and titanium. Examples of coated milling inserts include KC710 inserts and KC720 inserts, which are tungsten carbide based cemented carbide tools which have been PVD (physical vapor deposition) coated with a layer of titanium nitride having high residual compressive stresses. The substrates used in KC710 and KC720 tools contain about 8.5 and 11.5 weight percent cobalt, respectively, and various amounts of solid solution carbide forming elements.

It is known that PVD coatings may be applied to cemented carbide substrates by a variety of techniques, such as ion plating, magnetron sputtering and arc evaporation. In addition, each technique has many variations. It has been observed that these techniques and their variations result in PVD coated tools with a variety of properties. Depending on the exact technique used to deposit the coating, properties such as coating hardness, residual stress, tendency to react or bond to the substrate may be positively or adversely affected. These PVD techniques and the properties of the resulting coatings and how PVD coatings compare to CVD (chemical vapor deposition) coatings are described in: Buhl et al, "TiN Coatings on Steel," Thin Solid Films, Vol. 80 (1981) pages 265-270; Buhl et al, U.S. Pat. No. 4,448,802 (foregoing described the Balzers AG ion plating technique and equipment used by the applicants herein); Munz et al, "A High Rate Sputtering Process for the Formation of Hard Friction-Reducing TiN Coatings on Tools," Thin Solid Films, Vol. 96 (1982) pages 79-86; Munz et al U.S. Pat. No. 4,426,267; Kamachi et al, "A Comparison of Residual Stresses in Cemented Carbide Cutting Tips Coated with TiN by the CVD and PVD Processes and Their Effect on Failure Resistance," Surfacing Journal International, Vol. 1, No. 3 (1986) pages 82-86; Wolfe et al, "The Role of Hard Coatings in Carbide Milling Tools," Journal of Vacuum Science Technology, A3 (1986) pages 2747-2754; Quinto et al, "High Temperature Microhardness of Hard Coatings Produced by Physical and Chemical Vapor Deposition," Thin Solid Films, Vol. 153 (1987) pages 19-36; Jindal et al, "Adhesion Measurements of Chemically Vapor Deposited and Physically Vapor Deposited Hard Coatings on WC-Co Substrates," Vol. 54 (1987) pages 361-375; Jindal et al, "Load Dependence of Microhardness of Hard Coatings," Surface and Coatings Technology, Vol. 36 (1988) pages 683-694; Rickerby et al, "Correlation of Process and System Parameters with Structure and Properties of Physically Vapour-Deposited Hard Coatings," Thin Solid Films, Vol. 157 (February 1988) pages 195-222; Quinto et al, "Mechanical Properties, Structure and Performance of Chemically Vapor-Deposited and Physically Vapor-Deposited Coated Carbide Tools," Materials Science and Engineering, A105/106 (1988) pages 443-452.

It is the inventors' opinion that the technique that provides the best PVD coating is that described in the Buhl et al patent and article mentioned above which utilizes the Balzers AG ion plating technology and equipment. This belief is based on their analysis of different types of PVD coated tools which have shown that, in PVD TiN coatings, the highest hardnesses and the highest compressive residual stresses are attainable in the Balzers AG ion plated PVD coating. These properties produce a cutting tool that has higher wear resistance and less susceptibility to edge chipping and breakage than possessed by other PVD coated cutting tools. The PVD TiN coating on KC710 and KC720 is produced by the above Balzers PVD technique.

In addition, binder enriched grades of cutting tools have also been utilized in milling applications. These inserts include KC850 inserts and KC950 inserts. KC850 inserts have a C-type porosity cobalt enriched tungsten carbide based cemented carbide substrate having a bulk cobalt content of about 5.9 weight percent cobalt, and having additions of solid solution carbide forming elements. The KC850 inserts further have a CVD (chemical vapor deposition) coating on the substrate, having three layers: an inner layer of titanium carbide; an intermediate layer of titanium carbonitride and an outer layer of titanium nitride. The CVD three layer coating is described in U.S. Pat. No. 4,035,541.

The KC950 inserts have an A type porosity, cobalt enriched tungsten carbide based cemented carbide substrate having a bulk cobalt content of about 6.0 weight percent and having additions of solid solution carbide forming elements. The KC950 inserts further have a CVD coating composed of an inner layer of titanium carbide, a middle layer of aluminum oxide and an outer layer of titanium nitride. The cobalt-enrichment in KC850 inserts and KC950 inserts occurs in a zone at the periphery of the cemented carbide substrate and may be accompanied by solid solution carbide depletion. The cobalt concentration in the enriched zone typically has a maximum value in the range of 150 to 300 percent of the bulk cobalt content. The enrichment mechanism in KC950 is described in U.S. Pat. No. 4,610,931. (KC950, KC850, KC, KC710, KC720, K, K2885 and K2884 are trademarks of Kennametal Inc. for its cemented carbide grades of cutting inserts and are used as such herein).

CVD coatings are characterized by residual tensile stresses and thermal cracks due to differences in the thermal expansion coefficients of the CVD coating and the cemented carbide substrate. Therefore, CVD coated tools are more susceptible to edge chipping than PVD coated tools.

While the foregoing prior art cutting insert grades have all been commercially useful, there is always a need to further reduce the aforementioned problems associated with milling, of either limited cutting edge lifetimes due to premature chipping or due to deformation and/or flank wear.

SUMMARY OF THE INVENTION

Applicants have now discovered a cemented carbide cutting insert, having a coating of hard refractory layers, which has an improved combination of toughness, edge strength, thermal and mechanical shock resistance, deformation resistance and wear resistance. Applicants have demonstrated that a metalcutting insert having a substrate with a peripheral zone enriched in cobalt combined with a hard refractory coating having a CVD inner layer and a PVD outer layer, surprisingly provides wear resistance and additional chipping resistance while improving both the cutting edge lifetime and the consistency of tool performance in the milling of AISI 4140 steel.

In accordance with the present invention, a cutting tool is provided having a rake face and a flank face with a cutting edge at a junction of the rake and flank faces. The cutting tool has a coating which is bonded to a substrate. The substrate is made of metal carbide grains bonded by a binder material. The concentration of the binder is greater near a peripheral boundary of the substrate compared to its concentration away from the peripheral boundary. The coating has a number of layers, including a chemical vapor deposition (CVD) layer and a physical vapor deposition (PVD) layer. Preferably, the outermost PVD layer of the coating is outside of the last CVD layer. At least one PVD layer, preferably one outside of the last CVD layer, is in a state of residual compressive stress.

Preferably, for milling inserts, the binder concentration is enriched at or near both the peripheral boundaries of the substrate which are parallel to the flank and rake faces of the coated tool.

Preferably, the maximum binder enrichment is between 125 to 300 percent of the bulk binder content, more preferably 150 to 300 percent of the bulk binder content, and most preferably 200 to 300 percent of the bulk binder content of the substrate.

The CVD layer, or layers, may be selected from any of the hard refractory materials, such as the carbides, nitrides, carbonitrides, borides, boronitrides, oxycarbides, of titanium, zirconium, hafnium, and their solid solutions, and mixtures, and the oxides, and oxynitrides of aluminum. Preferably the CVD layer or layers include a layer or layers comprised of a hard nitride and/or carbonitride selected from the groups consisting of the nitrides and carbonitrides of titanium, hafnium, zirconium, their alloys with each other and their alloys with other elements.

The PVD layer, or layers, are preferably selected from any of the hard refractory materials such as the nitrides and carbonitrides of titanium, hafnium, and zirconium, their alloys with each other, and their alloys with other elements. Especially preferred are those now commercially available, such as titanium nitride, titanium carbonitride, and titanium aluminum nitride.

These and other aspects of the present invention will become more apparent upon review of the detailed specification in conjunction with the figures which are briefly described below.

DETAILED DESCRIPTION OF THE INVENTION

Figure 1:
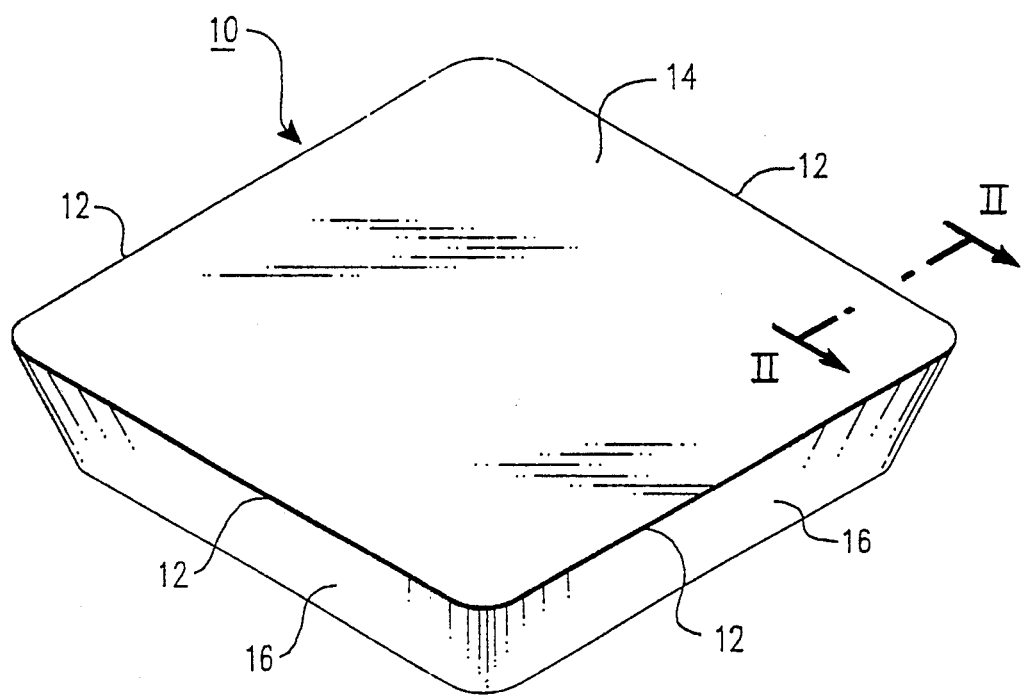
FIG. 1 shows an isometric view of an embodiment of a cutting tool in accordance with the present invention.

In accordance with the present invention, FIG. 1 shows a preferred embodiment of an indexable cutting insert 10 having cutting edges 12 at the junction of rake face 14 with flank faces 16. The cutting insert 10 shown in FIG. 1 and used in the subsequent examples is an SPGN-433 (ANSI B212.4-1986) in either a sharp (shown in FIG. 2) or honed (not shown) cutting edge condition.

Figure 2:
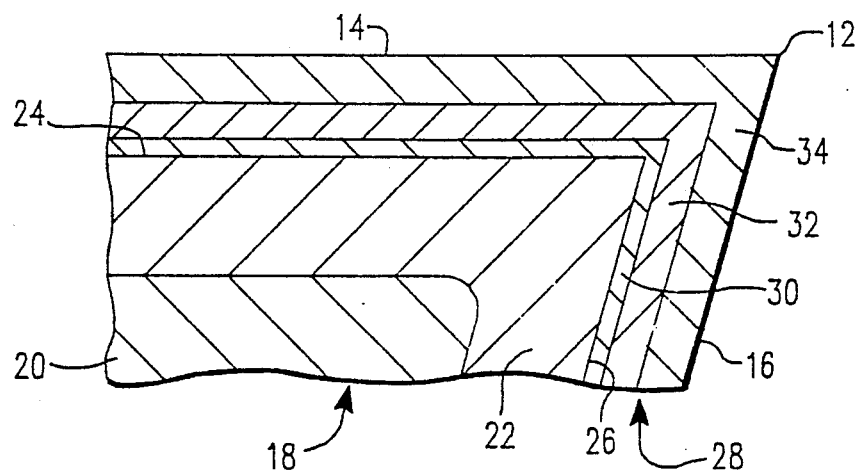
FIG. 2 shows a cross section of the cutting tool shown in FIG. 1, taken along II—II, as shown in FIG. 1.

FIG. 2 shows a cross section at the cutting edge 12, taken along section II—II of FIG. 1. In the embodiment shown in FIG. 2, the substrate 18 has two zones, a nonbinder enriched region 20 and an outer binder enriched zone near the peripheral boundaries 24 and 26 of the substrate. As shown in FIG. 2, it is preferred for milling applications that the binder enriched zone 22 be present underneath peripheral boundaries which lie parallel to the rake surface 14 and flank surfaces 16 of the cutting tool 10. In other applications, it is contemplated that the enriched zone 22 would be present under only the rake surface, it having been removed (e.g., by grinding) from the other surface.

In a preferred embodiment, the substrate is a WC based cemented carbide substrate containing at least 70 weight percent WC, and more preferably, at least 80 weight percent WC. The binder is preferably cobalt or a cobalt alloy and, preferably, has a bulk concentration of 3 to 12 weight percent More preferably, the bulk cobalt content is about 5 to about 8 weight percent, and most preferably, about 5.5 to about 7 weight percent. The substrate also preferably contains solid solution carbide forming elements such as Ti, Hf, Zr, Nb, Ta, V, preferably selected from Ti, Nb and Ta alone or in combination with each other. These elements preferably may be added to the mix as an element, alloy, carbide, nitride or carbonitride. Preferably, the concentration of these elements is as follows: Ta 0-12 w/o; Ti 0-10 w/o and Nb 0-6 w/o. More preferably, the sum of Ta plus Nb is between about 3 to about 7 w/o and the titanium content is between about 0.5 to 10 w/o. Most preferably, the titanium content is about 1.5 to 4.0 w/o.

These elements form solid solution carbides with the WC in the substrate, except that in the enriched zone 22, the solid solution carbides have been wholly or partially depleted.

Within the enriched zone, the binder (e.g., cobalt) content should reach a maximum value which is between about 125 to 300 percent, preferably 150 to 300 percent, and more preferably, 200 to 300 percent, of its bulk concentration in the substrate. The enriched zone preferably extends to the substrate peripheral boundaries 24 and 26, but alternatively there may be a thin layer adjacent to these boundaries in which cobalt content has been reduced due to evaporation during substrate sintering. The thickness of the enriched zone is preferably less than 50 micrometers ($\mu$m) and more preferably, less than 40 $\mu$m. Most preferably, the average thickness of the enriched zone is between about 5 to about 20 $\mu$m.

Bonded onto the peripheral boundaries 24 and 26 of the substrate 18 is a hard refractory coating having at least two layers, a CVD layer and a PVD layer, with the last PVD layer preferably being outside the last CVD layer. Applicants have found that, when the PVD layer also has a compressive residual stress, that excellent cutting edge lifetimes are provided in milling steel.

It should be understood that, while not a preferred option, the present invention, may however, include within its scope cutting tools having a CVD or other layer outside of the outermost PVD layer so long as the outermost CVD layer is not deposited at a temperature which significantly reduces the residual compressive stresses in the PVD layer, thereby reducing the chipping resistance of the cutting tool.

In the preferred embodiment, shown in FIG. 2, the inner CVD layer 30 is preferably a refractory nitride, such as Ti, Zr or Hf nitride. Nitrides are preferred over refractory carbides or carbonitrides for the inner layer adjacent to the substrates in order to minimize the formation of eta phase ($Co_3W_3C$ and/or $Co_6W_6C$) at the cemented tungsten carbide based substrate peripheral boundary. Eta phase is a brittle phase which may make the cutting edge more susceptible to chipping. The second layer 32 in the coating shown in FIG. 2 is preferably a CVD refractory carbonitride, or carbide, such as Ti, Zr or Hf carbonitride or, carbide, because of the higher hardness and abrasion resistance of the carbides and carbonitrides of Ti, Zr and Hf compared to their nitrides. The CVD second layer and any additional CVD layers may include, for example, alumina, either as a single layer or multiple layers separated from each other by a layer of another refractory material, such as a nitride, carbonitride or carbide of Ti, Hf or Zr, preferably, Ti.

Where it is desired to have an $Al_2O_3$ CVD layer next to the outer PVD layer, it is preferred, in order to improve the bond strength between the $Al_2O_3$ and the PVD layer that a CVD nitride, carbonitride or carbide layer of Ti, Hf or Zr is preferably deposited between the alumina CVD layer and the PVD layer.

The final and outermost layer 34 of the coating is a hard refractory PVD layer, such as a nitride or carbonitride of Ti, Zr or Hf. This outermost layer has residual compressive stresses Preferably, the total coating thickness (CVD plus PVD) is about 5 to 12 $\mu$m. In the past, while it has been known that greater thicknesses of coating improve wear lifetime, coating thicknesses for milling applications have been generally limited to about 5 $\mu$m or less, since above this thickness, chipping resistance decreases. Applicants have now found that, using the present invention, coating thicknesses of greater than 5 $\mu$m may be utilized to obtain a combination of improved chipping resistance and improved wear resistance in milling.

The present invention is further illustrated by the following examples which are provided purely for illustration and not limitation.

Binder enriched substrates were made by the following procedures and then coated with various layers as described below to produce SPGN-433 style inserts.

The substrate powder was produced in a two stage milling procedure as illustrated in Table 1. In the first stage, the components were added to a four foot diameter by 5 foot long mill jar with 3400 kilograms of cemented tungsten carbide cycloids along with 130 gallons of heptane and milled for 18 hours to a Fisher Apparent Particle Size of 1.05 $\mu$m. The second stage components along with 95 gallons of heptane were then added and the mix was ball milled an additional 12 hours to a Fisher Apparent Particle Size of 1.05 $\mu$m.

TABLE 1

| | Material | Size | Weight % of Charge | Chemistry Weight % | | | | | |
|---|---|---|---|---|---|---|---|---|---|
| | | | | C | Co | Ta | Ti | Nb | W |
| Stage 1 | WC | −40 Mesh | 53.8 | 3.32 | 3.91 | 3.66 | 2.00 | 0.37 | Rem. |
| | TiN | 1.3 $\mu$m | 2.0 | — | — | — | 1.50 | — | — |
| | TaNbC | −40 Mesh | 1.7 | 0.13 | — | 1.09 | — | 0.48 | — |
| Stage 2 | Co | 1.5 — | | | | | | | |
| | | 2.0 $\mu$m | 2.1 | — | 2.10 | — | — | — | — |
| | WC | 1.8 — | | | | | | | |
| | | 2.2 $\mu$m | 40.4 | 2.47 | — | — | — | — | Rem. |
| | C | | <.1 | .25 | — | — | — | — | — |
| TOTAL | | | 100 | 6.17 | 6.01 | 4.75 | 3.50 | 0.85 | Rem. |

Mill charge was then spray dried. SPGN-433 style insert substrates were then pressed and sintered. Sintering was performed at about 2650 degrees Fahrenheit for about 30 minutes under a vacuum. The resulting sintered substrates had their flank and rake faces ground, during which the binder enriched zone was removed. The cutting edges of some of the substrates were then honed, while in other substrates, the cutting edges were left in a sharp condition. The substrates were then resintered at 2650 degrees Fahrenheit for about 30 minutes in vacuum to again provide a cobalt enriched zone beneath both the flank and rake peripheral boundaries of the substrate. The base was then ground to insure flatness The resulting substrates had a magnetic saturation value of 90 percent, indicating the absence of C type porosity, and a magnetic coercive force value, $H_c \approx 191$ oerstads. Substrates of this type typically have a bulk hardness of about 92 Rockwell A and A type porosity with possibly minor amounts of B type porosity Evaluation of the substrate by energy dispersive spectroscopy showed a binder enriched zone near a peripheral boundary of the substrate having a thickness of about 20 to 25

μm and having a maximum cobalt concentration averaging about 12.7 w/o or averaging about 200 to 210 percent of the bulk substrate concentration.

The substrates were then coated with the CVD and PVD layers described in the following examples shown in Tables 2 through 6. The CVD coating techniques used were conventional in nature. First, a CVD TiN layer was applied to the substrate, and then a CVD-TiCN layer was applied on top of the CVD TiN layer. These layers were deposited between 950 and 1000 degrees Centigrade.

After the CVD TiCN layer, all surfaces (i.e., the rake and flank surfaces) except for the bottom surface, were coated with a PVD layer of TiN in a Balzers BAI-830 (Balzers AG, Liechtenstein) ion plating PVD coating unit at about 500 degrees Centigrade using a titanium source and a nitrogen atmosphere (see U.S. Pat. No. 4,448,802). As is common practice during the initial stage of coating, a very thin layer (detectable by high resolution TEM) of titanium was deposited on the CVD TiCN layer to provide improved adhesion between it and the PVD-TiN layer.

Residual stresses in the outermost TiN layer and in the WC of the substrate of the following inserts were analyzed:

1. Enriched substrate (made as described above)+CVD (TiN(1 μm)/TiCN(3 μm))+PVD TiN(4 μm)
2. Enriched substrate (made as described above)+CVD (TiN(1 μm)/TiCN(3 μm))/ TiN(4 μm))
3. Nonenriched substrate B (see Table 2)+CVD (TiN(1 μm)/TiCN(3 μm))+PVD TiN (4 μm)
4. Nonenriched substrate B+CVD (TiN(1 μm)/TiCN(3 μm)/TiN(4 μm))

The $\sin^2 \psi$ method of residual stress measurement was performed on the rake face of a sample of each of the foregoing inserts. The $\psi$ angles used were as follows: 0, 21, 30, 38, 45, 52, −21, −30, −45, −52. All the data were collected on a Rigaku DMAX diffractometer with a stress measurement attachment (manufactured by Rigaku of OSAKA, Japan). Conventional peak fitting methods were used to analyze the x-ray diffraction peaks. The data were then fed into a Rigaku stress analysis program. In performing the analysis, the following mechanical properties were assumed: for WC—Poisson Ratio=0.2 and Young's Modulus=700 Gpa; and for TiN—Poisson Ratio=0.2 and Young's Modulus=640 GPa. The peak reflections analyzed were the {211} reflection for WC and the {422} and {511} reflections for TiN. The residual stress was then calculated using a least squares fit to the peak data. This analysis showed that, where the outermost layer was a CVD TiN layer, it was under a residual tensile stress, but where the outermost layer was a PVD TiN layer, it was under a residual compressive stress. In all cases, the WC in the substrate had a residual compressive stress.

The machining performance of cobalt-enriched and non-enriched tools were evaluated by flycut milling tests as described below:
Workpiece material:
 AISI 4140 Steel (197-207 BHN)
Flycut milling conditions:
 850 sfm (surface feet/minute)
 0 008 ipt (inch/tooth)
 0.125 inch doc (depth of cut)
 Dry
Insert Style: SPGN-433
 Edge preparation sharp or honed as indicated.
 Milling cutter diameter and style:
  6 inch—Kennametal No. KDPR-6-SP4-30MB (see Pages 2 and 44 of "Kennametal/81 Milling Cutters for Greater Productivity" Catalogue No. A80-105(75)HO)
Width of Cut: 3 inch
Length of Cut: 24 inch
Type of Milling: Climb
Tool life criteria:
 FW=0.015 inch uniform flank wear
 MW=0.030 inch maximum local flank wear
 CH=0.030 inch chip In a first series of examples, non-enriched substrates of various types and an enriched substrate prepared as described above were each coated with a CVD TiN inner layer, a CVD TiCN intermediate layer and a PVD TiN outer layer. The nominal thickness of these three layers was, respectively, about 1, 3 and 4 micrometers (μm). The resulting sharp edge SPGN-433 tools were then tested against each other using the milling test procedure previously described in order to compare tool life and chipping resistance data. The results of these tests are shown in Tables 2, 3 and 4. As shown by the data of Table 2, the enriched substrate provided enhanced resistance to premature edge chipping, whereas the non-enriched substrates A and C showed susceptibility to failure by premature chipping. The Substrate B tools, while they did not undergo premature chipping, when chipping did occur, it was of a severe nature, rendering the cutting edge useless for further cutting. However, in the tools having an enriched substrate, where chipping was observed, it was of a relatively mild nature.

Comparing tools having enriched versus nonenriched substrates in Table 3, in a honed cutting edge condition, it can be seen that the failure mechanism is one of flank wear versus chipping for the enriched and nonenriched substrates, respectively. Chipping was not premature in the honed nonenriched substrate tools, since honing acts to mechanically strengthen the cutting edge, thereby reducing the chances of premature chipping. However, since the chipping was severe and is a relatively unpredictable phenomenon, this is still an undesirable condition, as indicated by the higher standard deviations found in tools having substrates B and C. Honing eliminated failure due to even mild edge chipping in the enriched substrates.

The superior edge chipping resistance of the enriched substrate is further substantiated by the results shown in Table 4 gathered from a test in which three tools of each type shown were run for six passes and the number of instances of chipping noted.

These tests thus underscore the key role played by the binder enriched periphery in combating edge chipping.

TABLE 2

COMPARISON OF ENRICHED AND NON-
ENRICHED SUBSTRATES USING SHARP CVD
(TiN (1 μm)/TiCN (3 μm)) + PVD TiN (4 μm)*
COATED CUTTING TOOLS

| Tool Material | Tool Life (minutes) and Failure Mode | | | $\bar{x}$ | s |
|---|---|---|---|---|---|
| Enriched Substrate | 9.4 mw | 12.2 ch | 13.6 fw-ch | 11.7 | 2.13 |
| Substrate A | 4.7 ch | 2.8 ch | 10.5 fw-ch | 6.0 | 4.01 |
| Substrate B | 11.2 mw | 11.2 ch | 12.6 ch | 11.7 | 0.81 |

TABLE 2-continued
COMPARISON OF ENRICHED AND NON-
ENRICHED SUBSTRATES USING SHARP CVD
(TiN (1 μm)/TiCN (3 μm)) + PVD TiN (4 μm)*
COATED CUTTING TOOLS

| Tool Material | Tool Life (minutes) and Failure Mode | | | $\bar{x}$ | s |
|---|---|---|---|---|---|
| Substrate C | 3.3 ch | 4.4 ch | 4.9 ch | 4.2 | 0.82 |

*All coating thicknesses reported herein are nominal thicknesses measured on the rake face within 2 mm of the cutting edge.
$\bar{x}$ = average tool life time in minutes
s = standard deviation in minutes
Substrate A = WC based cemented carbide with 10.5 w/o Co, 7 w/o Ta, 5.5 w/o Ti, 2.5 w/o Nb $R_A \approx$ 91.4, $H_c \approx$ 180, A porosity
Substrate B = WC based cemented carbide with 8.5 w/o Co, 10 w/o Ta, 6 w/o Ti, $R_A \approx$ 91.2, $H_c \approx$ 150, A porosity
Substrate C = WC based cemented carbide with 9.5 w/o Co, 7.5 w/o Ta, 6 w/o Ti, 2.5 w/o Nb $R_A \approx$ 91., $H_c \approx$ 150, A porosity TABLE 3
COMPARISON OF ENRICHED AND NON-
ENRICHED SUBSTRATES USING HONED CVD
(TiN (1 μm)/TiCN (3 μm)) + PVD TiN (4 μm)
COATED CUTTING TOOLS

| Tool Material | Tool Life (minutes) and Failure Mode | | | $\bar{x}$ | s |
|---|---|---|---|---|---|
| Enriched Substrate | 12.1 fw | 12.5 fw | 13.3 mw | 12.6 | 0.61 |
| Substrate A | 11.4 ch | 12.6 ch | 12.7 ch | 12.2 | 0.72 |
| Substrate B | 13.1 ch | 9.9 ch | 10.2 ch | 11.1 | 1.77 |
| Substrate C | 14.0 ch | 12.7 mw | 10.0 ch | 12.2 | 2.04 |

Hone = .002 inch radius

TABLE 4
COMPARISON OF ENRICHED AND NON-
ENRICHED SUBSTRATES USING HONED AND CVD
(TiN (1 μm)/TiCN (3 μm)) + PVD TiN (4 μm)
COATED CUTTING TOOLS

| Tool Material | Number of Instances of Chipping after Six Milling Passes (Three Tests) |
|---|---|
| Enriched Substrate | None |
| Substrate A | 3 |

TABLE 4-continued
COMPARISON OF ENRICHED AND NON-
ENRICHED SUBSTRATES USING HONED AND CVD
(TiN (1 μm)/TiCN (3 μm)) + PVD TiN (4 μm)
COATED CUTTING TOOLS

| Tool Material | Number of Instances of Chipping after Six Milling Passes (Three Tests) |
|---|---|
| Substrate B | 1 |

In a second series of examples, a PVD TiN coating and various CVD coatings were compared with CVD and PVD combination coatings. All substrates were enriched substrates (except as noted in Table 6) having the composition and prepared by the method previously described herein. The fly cut milling data are shown in Tables 5 and 6. The data show an absence of premature chipping and failure, and hence a more consistent tool life, in the case of tools coated with CVD layers plus an outer PVD layer. The data also shows that a PVD TiN coating alone does not provide sufficient resistance to tool wear in that the PVD TiN coated tools wore out rapidly compared with the CVD and the CVD +PVD coated tools (see Table 5). Table 6 demonstrates that, if the PVD coating is followed by a CVD coating without a final PVD coating (see coating 3), the tool is not provided with an improvement in lifetime (compare with coatings 1 and 2). This result is theorized to be due to the high temperatures ($\approx$900–1000 degrees Centigrade) utilized in the application of the subsequent CVD layers reducing the compressive residual stresses in the prior TiN PVD layer. Table 6 also demonstrates that, in those coatings having a final PVD layer, the average tool lives are longer and more consistent compared with the tools having only a CVD coating. These results clearly demonstrate the superior performance of the CVD+PVD coated cutting tool. These tools combine the wear resistance of CVD coatings, and the benefits of PVD coatings such as smoothness, compressive residual stresses and retention of edge strength, with edge chipping resistance provided by cobalt enrichment.

TABLE 5
COMPARISON OF CVD, PVD AND CVD + PVD COATINGS
USING ENRICHED SUBSTRATES*

| Coating | Tool Life (minutes) and Failure Mode | | | $\bar{x}$ | s |
|---|---|---|---|---|---|
| CVD {TiN(1 μm)/TiCN (3 μm)/TiN(4 μm)} | 11.9 mw | 11.1 ch | 14.0 fw | 12.3 | 1.50 |
| PVD TiN (4 μm) | 6.3 fw | 8.1 fw | 5.1 fw | 6.5 | 1.51 |
| PVD TiN (8 μm) | 8.2 fw | 6.7 fw | 9.3 mw | 8.1 | 1.07 |
| CVD {TiN(1 μm)/TiCN (3 μm)} + PVD TiN(4 μm) | 13.4 mw-ch | 14.0 fw-ch | 16.0 fw | 14.5 | 1.36 |

*sharp edge cutting tools

TABLE 6
COMPARISON OF CVD AND CVD + PVD AND PVD + CVD
AND PVD COATINGS USING ENRICHED SUBSTRATES[1]

| | Coating | Tool Life (minutes) and Failure Mode | | | $\bar{x}$ | s |
|---|---|---|---|---|---|---|
| 1. | CVD* | 3.3 ch | 22.3 ch | 10.6 ch | 12.07 | 9.61 |
| 2. | CVD* + PVD TiN (4 μm) | 25.2 fw/mw | 25.1 ch | 20.0 mw | 23.43 | 2.96 |
| 3. | PVD TiN (4 μm) + CVD* | 7.2 ch | 10.0 ch | 4.1 ch | 7.11 | 2.96 |
| 4. | CVD** | 19.6 mw/ch | 18.1 mw | 5.4 ch | 14.38 | 7.81 |
| 5. | CVD** + PVD TiN (4 μm) | 20.4 mw | 27.7 mw | 19.5 mw | 22.53 | 4.54 |
| 6. | CVD {TiN(1 μm)/TiCN (3 μm)/TiN(4 μm)} | 15.1 ch | 23.3 fw/mw | 3.5 ch | 13.98 | 9.93 |
| 7. | CVD {TiN(1 μm)/TiCN (3 μm)} + PVDTiN(4 μm) | 27.9 br | 23.8 fw/mw | 23.9 mw | 25.21 | 2.34 |

TABLE 6-continued

COMPARISON OF CVD AND CVD + PVD AND PVD + CVD
AND PVD COATINGS USING ENRICHED SUBSTRATES[1]

| Coating | Tool Life (minutes) and Failure Mode | | | $\bar{x}$ | s |
|---|---|---|---|---|---|
| 8. KC710[2] | 7.3 ch | 12.6 ch | 11.5 mw/ch | 10.48 | 2.81 |

*{5 sets of the following two layer combination TiCN (0.8 μm)/Al$_2$O$_3$ (0.2) followed by a TiCN(1 μm) layer}
**{2 sets of the following two layer combination TiCN (0.8 μm)/Al$_2$O$_3$ (0.2) followed by a TiCN(1 μm) layer}
[1]All inserts tested in a sharp cutting edge condition.
[2]Non-enriched prior art commercial grade having PVD TiN (4 μm) coating utilizing substrate type B.

All applications, patents and other documents referred to herein are hereby incorporated by reference.

Other embodiments of the invention will be apparent to those skilled in the art from a consideration of this specification or practice of the invention disclosed herein It is intended that the specification and examples be considered as exemplary only, with the true scope and spirit of the invention being indicated by the following claims.

What is claimed is:

1. A cutting tool comprising:
   a rake face and a flank face;
   a cutting edge at a junction of said rake face and said flank face;
   said cutting tool having a coating and a substrate, wherein said coating is bonded to said substrate;
   wherein said substrate is a cemented carbide having hard refractory grains bonded together by a binder material, wherein the binder material is cobalt or a cobalt alloy;
   wherein the concentration of said binder material is greater near a peripheral boundary of said substrate than the binder concentration is away from the peripheral boundary of the substrate;
   said coating having a number of hard refractory layers;
   said hard refractory layers including a chemical vapor deposition layer and a physical vapor deposition layer, wherein said physical vapor deposition layer is in a state of residual compressive stress, and wherein said chemical vapor deposition layer is located adjacent to said substrate.

2. The cutting tool according to claim 1 wherein said chemical vapor deposition layer includes a layer composed of a hard nitride selected from the group consisting of the nitrides of Ti, Hf, Zr, and their solid solutions and mixtures.

3. The cutting tool according to claim 2 wherein the hard nitride layer is titanium nitride.

4. The cutting tool according to claim 1 wherein said chemical vapor deposition layer includes a layer composed of a hard carbonitride selected from the group consisting of the carbonitrides of Ti, Hf, Zr and their solid solutions and mixtures.

5. The cutting tool according to claim 3 wherein said chemical vapor deposition layer further includes a second layer composed of a hard carbonitride selected from the group consisting of the carbonitrides of Ti, Hf, Zr and their solid solutions and mixtures alloys with each other and their alloys with other elements.

6. The cutting tool according to claim 1 wherein said physical vapor deposition layer is selected from the group consisting of the nitrides and carbonitrides of Ti, Zr, Hf and their alloys.

7. The cutting tool according to claim 2 wherein said physical vapor deposition layer is selected from the group consisting of the nitrides and carbonitrides of Ti, Zr, Hf and their alloys.

8. The cutting tool according to claim 3 wherein said physical vapor deposition layer is selected from the group consisting of the nitrides and carbonitrides of Ti, Zr, Hf and their alloys.

9. The cutting tool according to claim 4 wherein said physical vapor deposition layer is selected from the group consisting of the nitrides and carbonitrides of Ti, Zr, Hf and their alloys.

10. The cutting tool according to claim 5 wherein said physical vapor deposition layer is selected from the group consisting of the nitrides and carbonitrides of Ti, Zr, Hf and their alloys.

11. A cutting tool comprising:
    a rake face and a flank face;
    a cutting edge at a junction of said rake face and said flank face;
    said cutting tool having a coating and a substrate;
    wherein said substrate is a tungsten carbide based cemented carbide having a bulk composition of
    0-12 weight percent Ta,
    0-6 weight percent Nb,
    0.0-10 weight percent Ti, and
    3-12 weight percent Co;
    wherein the cobalt concentration is enriched in a zone near a peripheral boundary of said substrate;
    said zone having a maximum cobalt concentration of 125 percent to 300 percent of the bulk substrate cobalt concentration;
    said coating having a number of hard refractory layers;
    said hard refractory layers including at least one chemical vapor deposition layer and at least one physical vapor deposition layer;
    wherein said physical vapor deposition layer is in a state of residual compressive stress;
    wherein said chemical vapor deposition layer is adjacent to said substrate.

12. The cutting tool according to claim 1 wherein the outermost layer of said physical vapor deposition layer and said chemical vapor deposition layer is said physical vapor deposition layer.

13. The cutting tool according to claim 11 wherein said physical vapor deposition layer having residual compressive stress is the outermost layer of said coating.

14. The cutting tool according to claim 1 wherein said cutting edge is in a sharp condition.

15. The cutting tool according to claim 11 wherein said cutting edge is in a sharp condition.

16. The cutting tool according to claim 1 wherein the concentration of said binder is greater near said rake face, but not near said flank face.

17. The cutting tool according to claim 11 wherein said zone is present near a peripheral boundary parallel to said rake face, but not said flank face.

18. The cutting tool according to claim 11 wherein said chemical vapor deposition layer includes a titanium nitride layer adjacent to said substrate.

19. The cutting tool according to claim 11 wherein said chemical vapor deposition layer includes a first layer, a second layer, and a third layer; wherein said first and said third layers are selected from the group consisting of the carbides, nitrides and carbonitrides of Ti, Zr and Hf, and said second layer is an alumina layer; and wherein said physical deposition layer is located outside of said first layer, said second layer and said third layer.

20. An indexable cutting insert for use in the milling of steel comprising:
   a rake face and flank faces;
   cutting edges at junctions of said rake face said flank faces;
   said indexable cutting insert having a coating and a substrate, wherein said coating is bonded to said substrate;
   wherein said substrate is a tungsten carbide based cemented carbide containing at least 70 weight percent tungsten carbide and having a bulk composition including about 5 to 8 weight percent cobalt;
   wherein the cobalt concentration is enriched in a zone near a peripheral boundary of said substrate;
   said zone having a maximum cobalt concentration of 150 percent to 300 percent of the bulk substrate cobalt concentration;
   said coating having a number of hard refractory layers;
   said hard refractory layers including at least one chemical vapor deposition layer and at least one physical vapor deposition layer;
   wherein said outermost layer of said hard refractory layers is said physical vapor deposition layer; and wherein said outermost layer is in a state of residual compressive stress;
   a first chemical vapor deposition layer adjacent said substrate and composed of titanium nitride;
   and wherein said indexable cutting insert exhibits enhanced chipping resistance during said milling of steel.

21. The indexable cutting insert according to claim 20:
   wherein said bulk composition includes about 5.5 to 7 weight percent cobalt;
   and wherein said maximum cobalt concentration is 200 to 300 percent of the bulk substrate cobalt concentration.

22. The indexable cutting insert according to claim 20 further comprising:
   a second chemical vapor deposition layer composed of titanium carbonitride.

23. The indexable cutting insert according to claim 21 further comprising a second chemical vapor deposition layer composed of titanium carbonitride.

* * * * *